US009751591B2

(12) United States Patent
Carrasco Vergara et al.

(10) Patent No.: US 9,751,591 B2
(45) Date of Patent: Sep. 5, 2017

(54) HYDRAULIC DUAL CONTROL DEVICE FOR BICYCLE

(71) Applicant: Rotor Componentes Tecnologicos S.L., Madrid (ES)

(72) Inventors: Pablo Carrasco Vergara, Madrid (ES); David Martinez Garcia, Madrid (ES); Carlos Miguel Carton Cordero, Madrid (ES)

(73) Assignee: Rotor Componentes Tecnológicos SL, Madrid (ES)

( * ) Notice: Subject to any disclaimer, the term of this patent is extended or adjusted under 35 U.S.C. 154(b) by 0 days.

(21) Appl. No.: 14/909,776

(22) PCT Filed: Aug. 13, 2014

(86) PCT No.: PCT/EP2014/067325
§ 371 (c)(1),
(2) Date: Feb. 3, 2016

(87) PCT Pub. No.: WO2015/028307
PCT Pub. Date: Mar. 5, 2015

(65) Prior Publication Data
US 2016/0200390 A1   Jul. 14, 2016

(30) Foreign Application Priority Data

Aug. 26, 2013 (ES) .................................. 201331275

(51) Int. Cl.
*B62M 25/08* (2006.01)
*B62K 23/06* (2006.01)
*B62L 3/02* (2006.01)

(52) U.S. Cl.
CPC ............. *B62M 25/08* (2013.01); *B62K 23/06* (2013.01); *B62L 3/023* (2013.01)

(58) Field of Classification Search
CPC ......... B62K 23/02; B62K 23/06; B62L 3/023; B62M 25/08
See application file for complete search history.

(56) References Cited

U.S. PATENT DOCUMENTS 3,742,777 A * 7/1973 Mathauser ............. B62M 25/08
474/110
8,464,844 B2 * 6/2013 Jordan .................... B60T 7/102
188/24.22
8,646,353 B2 * 2/2014 Uno ........................ B60T 7/102
188/24.11

(Continued)

*Primary Examiner* — Adam D Rogers
(74) *Attorney, Agent, or Firm* — Power Del Valle LLP; Marguerite Del Valle (57) ABSTRACT

A bicycle dual control device hydraulically operated, so that using one single device the cyclist may operate, by applying different hand pressures or taps from the handlebar, two unidirectional control mechanisms, preferably a brake and a bicycle gear-shifting mechanisms. The control device comprises two unidirectional control units within a single lever or handgrip attached to the handlebar, wherein each one of them comprises an acting member, an operating member connected to a control circuit and a coupling element which links the two previous members. In a preferred embodiment of the invention, the operating member related to the gear shifting is hydraulic and comprises a piston and a cylinder mounted integrated inside the brake acting member.

18 Claims, 8 Drawing Sheets

(56) References Cited

U.S. PATENT DOCUMENTS

| | | | |
|---|---|---|---|
| 9,233,730 B2* | 1/2016 | Kariyama | B62L 3/023 |
| 9,321,505 B2* | 4/2016 | Miki | B62L 3/023 |
| 9,365,260 B2* | 6/2016 | Nago | B62K 23/06 |
| 2010/0199798 A1 | 8/2010 | Uno | |
| 2012/0160625 A1 | 6/2012 | Jordan | |
| 2013/0180815 A1 | 7/2013 | Dunlap et al. | |
| 2013/0333994 A1* | 12/2013 | Jordan | B62L 3/02 188/344 |
| 2016/0129968 A1* | 5/2016 | Meggiolan | B62K 23/06 188/344 |

* cited by examiner

FIG. 5A
section A-A

FIG. 5B
section D-D

FIG. 7A
section A-A

FIG. 7B
section D-D

HYDRAULIC DUAL CONTROL DEVICE FOR BICYCLE

The present invention relates to a bicycle dual control device, so that using one single device the cyclist may operate, by applying various hand and/or finger pressures or taps from the handlebar, two different unidirectional mechanisms, for example a brake mechanism and a bicycle gear-shifting mechanism.

PRIOR ART

Modern bicycles typically include one or more bicycle control devices for several mechanisms that are operated on several ways: mechanically, by cable pulling, hydraulic pushing, or electronically. For instance, the braking mechanism is used to decelerate and/or stop the bicycle, the suspension mechanisms are used to dampen shocks when the bicycle is ridden over rough terrain, and the gear shifting mechanisms for chain transmission system are used to obtain different gear ratios, by making the chain to switch from one sprocket to another in the case of the rear derailleur, or from one chainring to another in case of the front derailleur.

Said mechanisms are operated from its corresponding control device, usually mounted on the handlebar, which includes levers or buttons to be actioned by the cyclist. Referring to the gear shifting control mechanism, the left hand commonly controls the front derailleur and the right one the rear derailleur. Due to safety and ease reasons to drive the bicycle, the control device of each derailleur is usually coupled next to each brake operating member, which are usually levers.

When the control device is mechanically operated, the cyclist typically applies an action force with some fingers on a control lever, which transmits the action force in turn to the operating member of the mechanism (shifting or braking), which transmits the force to a circuit that will operate the other end of said circuit acting on the corresponding mechanism.

In the case of mechanically operated control devices for gear shifting mechanisms, the operating member of the derailleur is often provided with an indexing mechanism that will set the derailleur positions for the correct use of the gear shift.

Sometimes the bicycle gear shift control unit and the bicycle brake control unit are separate individual control devices, while other times they are combined as a single integrated dual function unit. The latter is the case of road bicycles with curved handlebar, where the bicycle gear shift levers and the bicycle brake lever are normally embodied in a single control dual function device. Therefore, the lever or levers corresponding to one derailleur are coupled with the brake lever as a single dual control device which also embodies one handgrip, so a single control device is dual functioned and is operated by one hand of the cyclist, including one brake and one derailleur operating members, which means the brakes and shifts may be operated from the same gripping area, achieving a high safety and efficacy improvement in race.

Said control devices usually have a supporting member to structure said handgrip, and it is mounted on the bicycle handlebar. Its inner space houses one or more operational units of the corresponding mechanism (braking and/or gear shifting).

One example of mechanical control device via cables designed for brake and gear shift alike is disclosed in the document Shimano US20110079103. In some cases, the braking function and the gear shifting function are performed with a single lever which is able to pivot on two orthogonal axes, as disclosed in the document Shimano U.S. Pat. No. 5,400,675.

Typically, one or two gear shifting levers are provided in addition to the braking lever, as the device disclosed in the document Sram EP1698550 with one lever, or Campagnolo U.S. Pat. No. 5,257,683 with two. In both cases, the gear shift control device as well as the brake control device work via cable. Another control device embodiment is disclosed in Sram US2013180815, where the brake operated member is a piston inside a hydraulic cylinder.

In the aforementioned solutions disclosed in the prior art to integrate the mechanical operating device of the brake and gear shift systems, the problem that arises is the volume limitation of the device because it embodies a handgrip for one hand, so whether an indexing mechanism has to be housed for the gear shift system, then it is not possible to get spare space to hold a hydraulic operating member of said gear shift system as well.

In the case of the present invention, a hydraulic operating member for the gear shifting system is proposed removing the gear shift indexing mechanism from the inner part of the supporting member to be relocated to another point of the gear shifting hydraulic circuit, at its end or at a half-way point, on the derailleur itself, as the derailleurs disclosed in the patent application WO2013117450A1, that belongs to the present applicant. Thus, in the dual control device disclosed in the present document the volume and complexity are highly reduced, and, in addition, the accuracy of the gear shift systems involved is increased because the indexing mechanism is approached to the corresponding derailleur.

Most bicycle brake systems consist of four main components: a mechanism for the rider to operate the brakes, such as brake levers; a mechanism for transmitting that signal, such as Bowden cables, hydraulic hoses, rods; the brake mechanism itself: a caliper (in rim and disc brakes), to press two or more surfaces together in order to convert, via friction, kinetic energy of the bike and rider into thermal energy to be dissipated; and the rotor or braked element (pads contact surface of the rim).

Specifically relating to a hydraulic disc brake system, this typically includes a hydraulic brake control device, a rotor attached to one of the bicycle wheels and a brake caliper having a slot that receives the rotor therein. The brake caliper has two brake pads that selectively contact the rotor in response to changes in hydraulic pressure in the hydraulic brake control device when an actuator such as a lever is moved. Bicycle typically include a front braking system to apply a braking force to the front wheel and a rear braking system to apply a braking force to the rear wheel.

A hydraulic brake actuation device typically has a housing mounted to the bicycle handlebar. The housing includes a master cylinder, a master piston disposed in the master cylinder and an actuation lever pivotally supported on the housing. The housing includes a master cylinder bore with a master piston slidably disposed in the master cylinder bore. By pivoting the actuation lever, the master piston is moved in the master cylinder bore via push rod. The movement of the master piston increases the hydraulic pressure in the brake system such that a slave piston in the caliper is moved. This movement of the slave piston in the caliper causes the brake pads to move together to squeeze the rotor.

Some hydraulic brakes actuation devices in the Prior Art are provided with adjustments mechanisms for controlling the resting position of the lever to adjust the reach of the lever, and with an adjustment mechanism for controlling a free stroke of the master piston in order to control the braking action. Examples of said adjustments are disclosed in document US20140174244 Shimano.

SUMMARY OF THE INVENTION

The present invention relates to a bicycle dual control device, attachable to the handlebar, so the cyclist may operate from the handlebar by several taps or pushes with the hands or fingers, a single device that comprises two unidirectional mechanisms, for example a bicycle braking mechanism and a bicycle gear shifting mechanism.

Said dual control device has two unidirectional control units, preferably the first one corresponding to a brake system and the second one corresponding to a gear shifting system, each one of them comprising an acting element, a coupling assembly and an operating member, being the movement planes of both acting elements preferably orthogonal: the first acting element, the braking one, moves in a plane that is approximately parallel to the riding direction while the second, the shifting one, moves in a plane that is approximately orthogonal to said riding direction. Furthermore, there is a support member fixed to the bicycle handlebar with a clamp or mounting member.

The aforementioned operating members connect said acting members to its corresponding mechanism through a control circuit, by means of a cable and its housing, or by means of a hydraulic hose with liquid in the case of hydraulic configuration.

Therefore, in one embodiment, the first unidirectional control unit, the braking one, is provided with a first operating member which works by means of cable pulling using a pulley, a cam or a lever; however, in another embodiment of the invention, said first operating member is hydraulic comprising a first master piston that moves within its corresponding first master cylinder.

The second unidirectional control unit, the shifting one, is provided with a hydraulic second operating member that comprises a second master cylinder and its corresponding second master piston, as well as a second coupling assembly which links the master piston with the acting element. This second control unit corresponding to the gear shift does not include any indexing mechanism.

The object of the present invention is a dual control device wherein said second unidirectional control unit, is integrated into the first acting element, where said second master cylinder is arranged or attached inside the body of the first acting element itself. In addition, the aforementioned second acting element pivots around a fix shaft of the first acting element, and it is coupled to the second operating member by a second coupling assembly; therefore this second coupling assembly pushes said second piston inside the second cylinder transmitting the action to the second control circuit.

In a doubly hydraulic embodiment of the invention, both operating members are hydraulic comprising its corresponding pistons and master cylinders.

The way each of the two control units are operated is unidirectional, thus the cyclist operates each one of the two acting elements by applying a force in a single direction, and they return to its initial position when the force stops due to the action of the corresponding return spring that pushes the piston (first or second) against the cyclist operating direction. Consequently, the displacement made by the action of the cyclist on each acting member produces the movement of the piston inside its corresponding master cylinder, increasing the pressure of the inner hydraulic fluid of each control circuit. This control circuit connects each master operating member with its corresponding slave operating member, consisting of a slave cylinder and piston in this embodiment, located at the other end in order to transmit the action to a brake device in one case, or in the other case, to a related indexing mechanism belonging to a gear shifting device that sets the different gears executed by a corresponding derailleur.

In the particular case of the second control unit, the one of the bicycle gear shift, depending on how is the operation of the acting element, shorter or longer, it will cause different positive or negative increasing jumps on the corresponding indexing mechanism which will be designed to do it, therefore a short displacement on it will cause a discharging movement of the derailleur with a unitary and negative increase of gears, whereas a longer displacement of said second acting element causes a charging movement of the gears of the derailleur that can be a positive increase of one or more gears.

BRIEF DESCRIPTION OF THE FIGURES

FIG. 3: Shows the bicycle dual control device (1) of FIG. 2 without housing cover (60) in another view FIG. 3A and section in FIG. 3B.

FIG. 4: Shows another embodiment of a bicycle dual control device (1), with the second operating member (26) arranged in a separate element attached inside the first acting member (11), but moving jointly and severally with it. Furthermore, this embodiment corresponds with a configuration functioning with a closed hydraulic first circuit (14). In addition, in said embodiment the first acting member (11) pivots around a first pivot axis (B1). We can see in FIG. 4A the first acting member (11) in a rest position, and in FIG. 4B γ 4C (top view) the same configuration but in a working position (braking) of the first acting member (11).

FIG. 5: Shows the corresponding sections of the bicycle dual control device (1) in a working position (braking) of FIG. 4 named as section A-A in FIG. 5A and section D-D in FIG. 5B.

FIG. 6: Shows another embodiment for a bicycle dual control device (1), with the second operating member (26) arranged in a separate element attached inside the first acting member (11), but moving jointly and severally with it. It is also shown a first fluid reservoir (19) for the first hydraulic circuit (14). Furthermore, this embodiment corresponds with a configuration functioning with an open hydraulic first circuit (14). In addition, in said embodiment the first acting member (11) pivots around a different first pivot axis (B2). We cans see in FIG. 6A the first acting member (11) in a rest position, and in FIG. 6B γ 6C (top view) the same configuration but in a working position (braking) of the first acting member (11).

FIG. 7: Shows the corresponding sections of the bicycle dual control device (1) in a working position (braking) of FIG. 6 named as section A-A in FIG. 7A and section D-D in FIG. 7B.

DETAILED DESCRIPTION OF THE PREFERRED EMBODIMENTS

It is an object of the present invention a bicycle dual control device (1) comprising two unidirectional control units (10, 20), where said second unidirectional control unit (20) is a hydraulic control unit for the bicycle gear shift.

In a preferred embodiment of the present invention the bicycle dual control device (1) comprises:

- a housing cover (60), a first supporting member (17) attached to the bicycle handlebar (0) with a mounting member (50);
- a first unidirectional control unit (10), configured to operate a first control mechanism through a first control circuit (14), comprising a first operating member (16) linked to the first control circuit (14) and operated by a first acting element (11) to be operated with the hand or fingers of the cyclist, and a first coupling assembly (15) which links said first operating member (16) with said first acting element (11), therefore the first acting element (11) pivots around a fix first pivot axis (B) of said first supporting member (17) roughly orthogonal to the riding plane of the bicycle;
- and a second unidirectional control unit (20), configured to operate a second control mechanism through a second control circuit (24), comprising a second operating member (26) linked to the second control circuit (24) and operated by a second acting element (21) to be operated with the hand or fingers of the cyclist, and a second coupling assembly (25) which links said second operating member (26) with said second acting element (21).

Said second control unit (20) is hydraulic and it is integrated inside the first acting element (11), and the second operating member (26) comprises a second master cylinder (22) mounted into the body of the first acting element itself (11) and a second master piston (23) reciprocating within said second master cylinder (22) and biased by means of a second return spring (18), being the second acting element (21) coupled to the second master piston (23) through the second coupling assembly (25) that pushes said second master piston (23) inside said second master cylinder (22).

Said bicycle dual control device (1) may further comprise a second fluid reservoir (29) to store hydraulic fluid for generating hydraulic pressure in the second control circuit (24).

The aforementioned second acting element (21) pivots around a second pivot axis A fixed into the first acting element (11), being the displacement of said second acting element (21) orthogonal to the displacement of said first acting element (11), thus said second acting element (21) moves jointly with the first acting element (11), and also has an additional rotating movement related to the first acting element (11) around said second pivot axis A, therefore the rotating working movement of the second acting element (21) causes a displacement of the second coupling assembly and consequently a lineal movement of the second master piston (23) within the second master cylinder (22), which increases the fluid pressure in the second control circuit (24). In addition, said second pivot axis A of the second acting element (21) is orthogonal to the plane that containing the longitudinal axis (C) of the second master cylinder (22) is parallel to the first pivot axis (B) of the second acting element (21).

In another preferred embodiment of the invention that is doubly hydraulic, said first unidirectional control unit (10), is a bicycle brake hydraulic control unit, where the first operating member (16) is hydraulic and comprises a first master cylinder (12), a first master piston (13) reciprocating within said first master cylinder (12) and biased by means of a first return spring (18), and a first coupling assembly (15) which links the first master piston (13) with the first acting element (11). Said operating member (16) is arranged integrated inside the support member (17).

The aforementioned operating members (16, 26) are connected to its corresponding mechanism, brake or shift respectively, through a hydraulic control circuit (14, 24) comprising a hose with liquid, which connects each master cylinder (12, 22) with each corresponding slave cylinder located at the other end of the circuit in order to transmit the operation to a brake in one case, and, in the other case to its corresponding indexing mechanism that sets the different gears executed by a derailleur.

Figures 3, 3A:
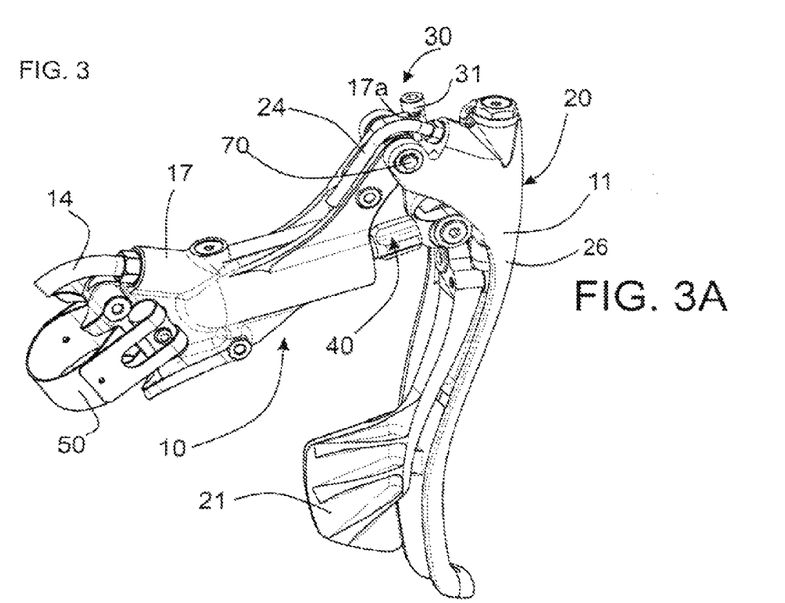
Figures 4, 4A, 4B, 4C:
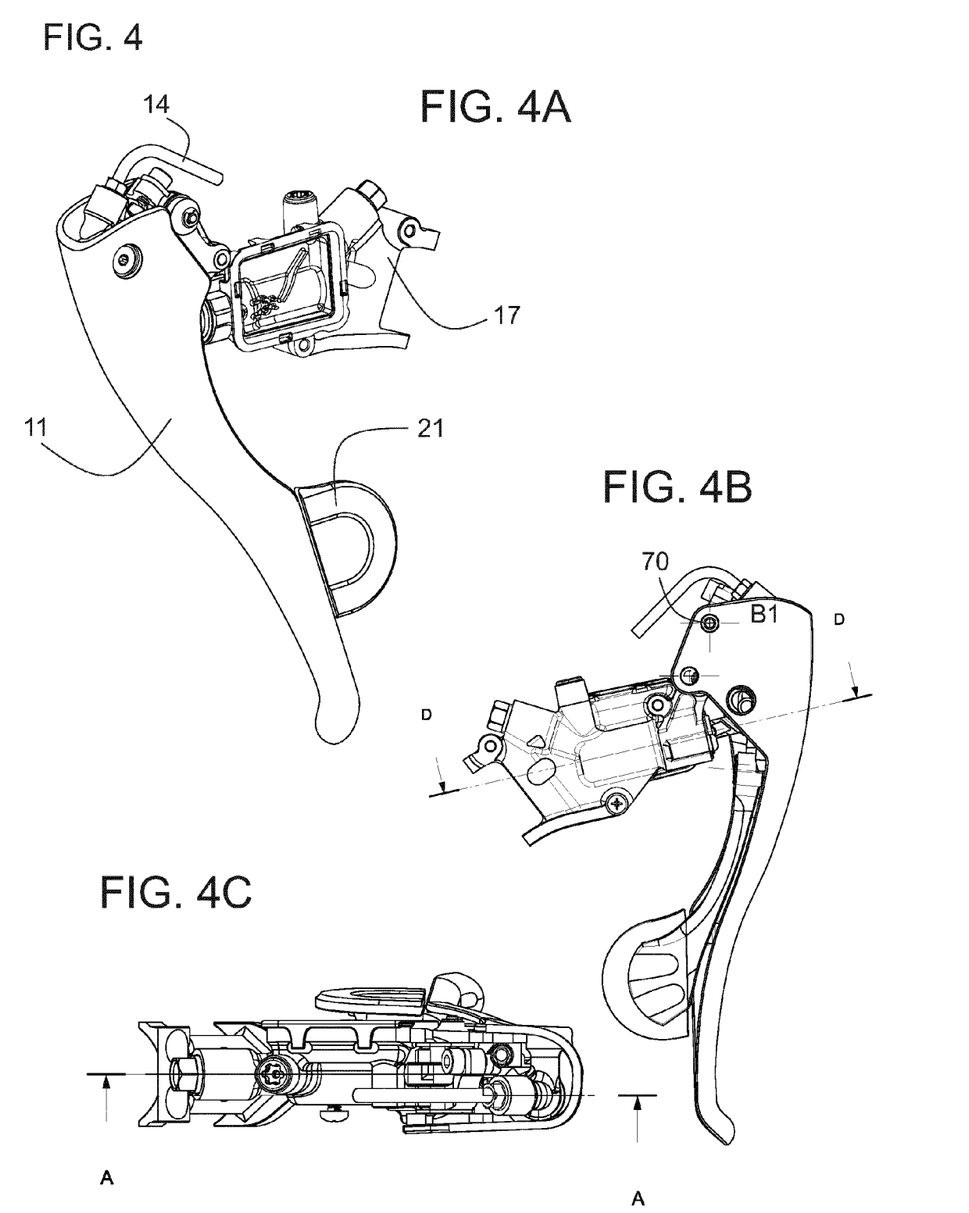

As seen in FIGS. 3 and 4, the first acting element (11) is pivotally attached to the first support member (17) by a pivot pin (70) located in Axis B for movement between a lever resting position and a lever working position. The first acting element (11) is operatively coupled to the first coupling assembly (15), which in turn is coupled to the first master piston (13). During a braking operation, the first acting element (11) is forced by the cyclist to pivot on the first pivot Axis B from the lever resting position to the lever braking position to push the first coupling assembly (15), which in turn moves the first master piston (13) in the first master cylinder (12) from the piston resting position to one piston braking position. When the cyclist stops braking and release the first acting element (11), the return spring (18) moves the first master piston (13) and consequently the first acting member (11) to the resting position again.

Figure 3B:
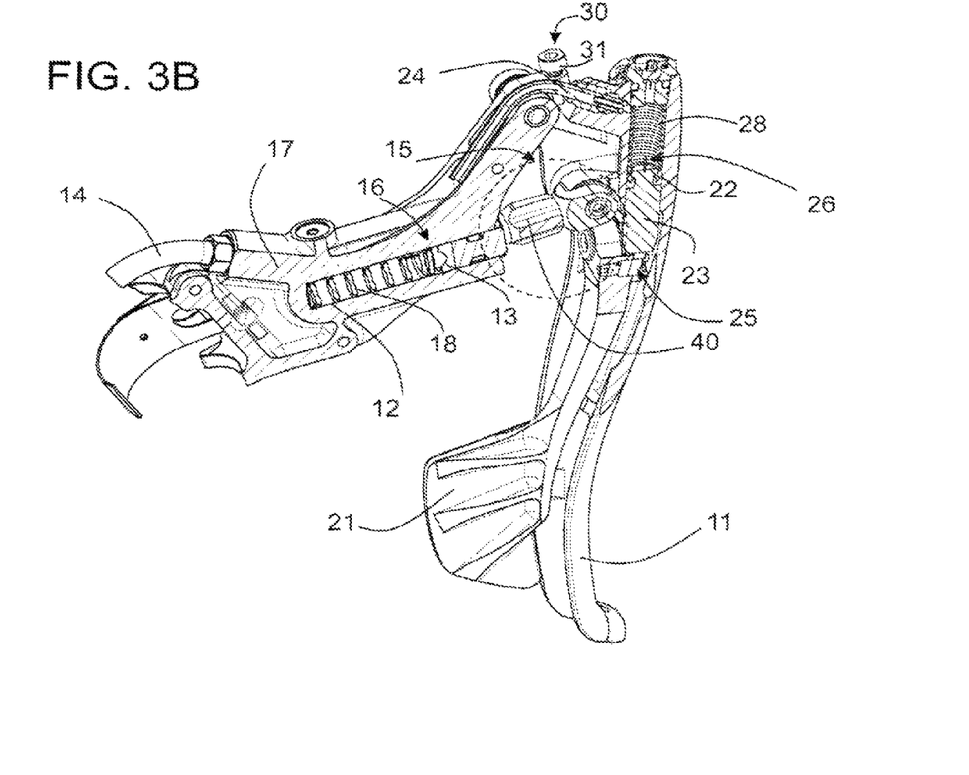
Figures 5, 5A:
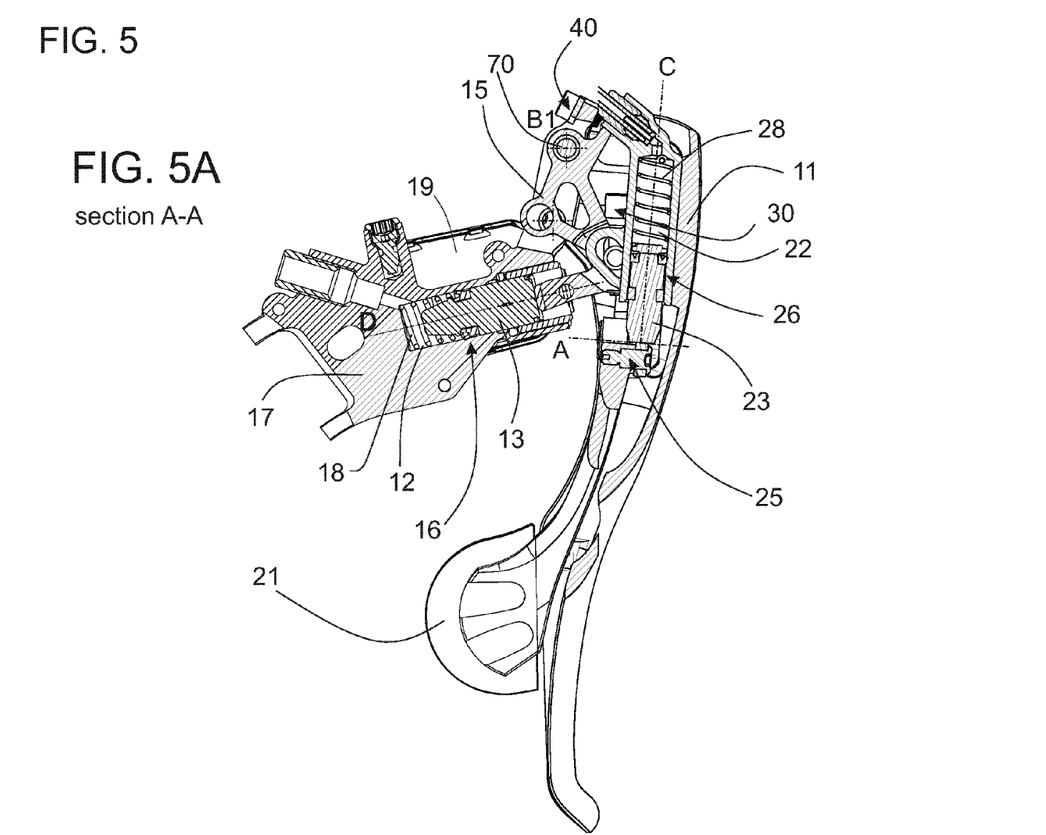
Figure 5B:
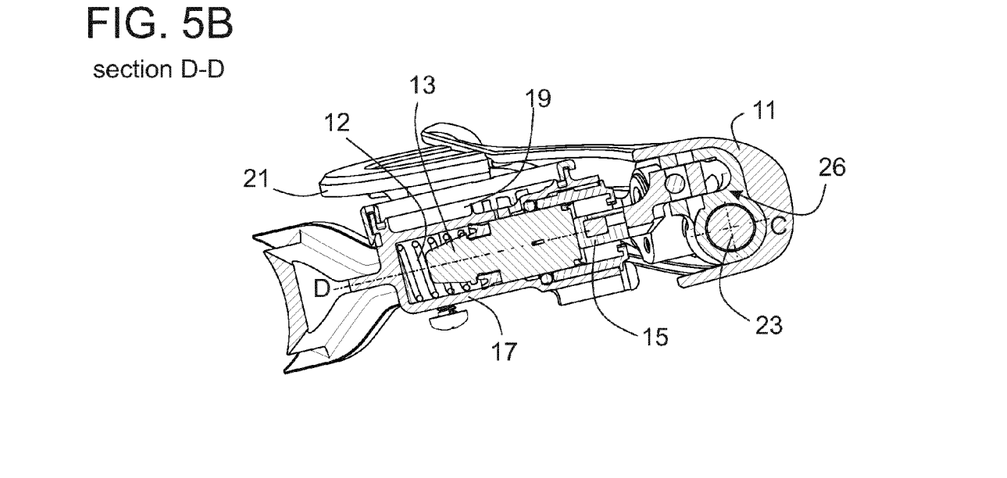

As best shown in FIG. 3B, the first master piston (13) is slidably disposed in a bore of the first master cylinder (12) to move between a piston resting position and one piston working (braking) position. As best shown in FIGS. 4A and 5A, a first fluid reservoir (19) to store hydraulic fluid for generating hydraulic pressure in the first control circuit (14) is provided in the first supporting member (17). Said first fluid reservoir (19) is in fluid communication with the first master cylinder (12) via opening holes arranged in the first master cylinder (12), in such a manner, that the first control circuit (14) is able to work in an open circuit or in a closed one, depending on the resting position of the first master piston (13) within the first master cylinder (12) that defines a different relative position between the first master piston (13), and said opening holes arranged in the first master cylinder (12).

Movement of the first master piston (13) causes corresponding movement of a first slave piston in a brake caliper (not shown) located at the other end of the first control circuit (14), in accordance with corresponding increases in the fluid pressure within the first master cylinder (12).

Typically, when the acting member of the hydraulic brake actuation device is moved, the slave cylinder(s) also moves a corresponding amount. Thus, when the acting member of the hydraulic brake actuation device is initially moved, braking contact is delayed because the brake pads must first move and close the gap between the brake pads and the braking surfaces of the rotor. The movement of the brake pads typically corresponds directly movement of the acting lever in a movement ratio. Specifically, for each angular degree of movement of the acting lever, there is a corresponding movement of the brake pads.

So, another object of the present invention in order to regulate the braking action is a first unidirectional control unit (20), with different adjustment mechanisms:

A user adjustable assembly, named rest adjustment assembly (40) to adjust the initial resting position of the first master piston (13) within the first master cylinder (12). So this rest adjustment assembly (40) adjusts the initial pressure of the first control circuit (14) to suit the rider touch, and it also allows compensating brake pad wear that occurs over time at the other end of the first control circuit (14). In FIG. 3 it is shown an embodiment for said rest adjustment assembly (40) arranged as a threaded connecting rod on the first coupling assembly (15) configured to push a greater or lesser length said first master piston (13) inwards the first master cylinder (12) by screwing more or less, thus changing the initial resting position of the first master piston (13).

And a reach adjustment assembly (30) to settle the resting angular position of the first acting element (11) in relation to the first supporting member (17) attached to the bicycle handlebar (0). The functionality of this reach adjustment assembly (30) is to regulate the scope of the brake lever displacement, to adapt to different user's hand size, in order to locate the first acting element (11) at a position farthest or nearest from the first supporting member (17) to fit large or little hands respectively. In FIG. 3 we can see an embodiment for said reach adjustment assembly (30) comprises a threaded receiving hole (17a) in the first supporting member (17), a stopper bolt (31) screwed into said receiving hole (17a) and a stop abutment (11a) arranged in the first acting member (11), so that by screwing more or less the stopper bolt (31), it changes the angular position of said first acting member (11).

Other Embodiments

In an alternative embodiment of the invention, said first unidirectional control unit (10), is a mechanical control unit of the bicycle braking system connected through a first control circuit (14) by means of a Bowden cable or similar with its corresponding braking caliper located at the other end of said control circuit (14).

At said first control unit (10) the first control circuit (14) is cable driven, and the first operating member (16) is a pull-release cable type comprising a pulling element to pull the cable driven first control circuit (14), so that the movement of the first acting element (11) moves said pulling element in the pulling direction of the cable.

In a further embodiment for the present invention shown in FIGS. 4, 5, 6 and 7, said first acting element (11) pivots around a fix first pivot axis B of said first supporting member (17) that may be chosen by the user between two different positions named B1 and B2, by screwing the double function pivot pin (70) in the B1 or B2 holes arranged in the first acting member (11), thus allowing to have two different working positions for the first acting element (11) with two corresponding different strokes of the first master piston (13), and consequently two different working pressures in the first control circuit (14).

Figure 1:
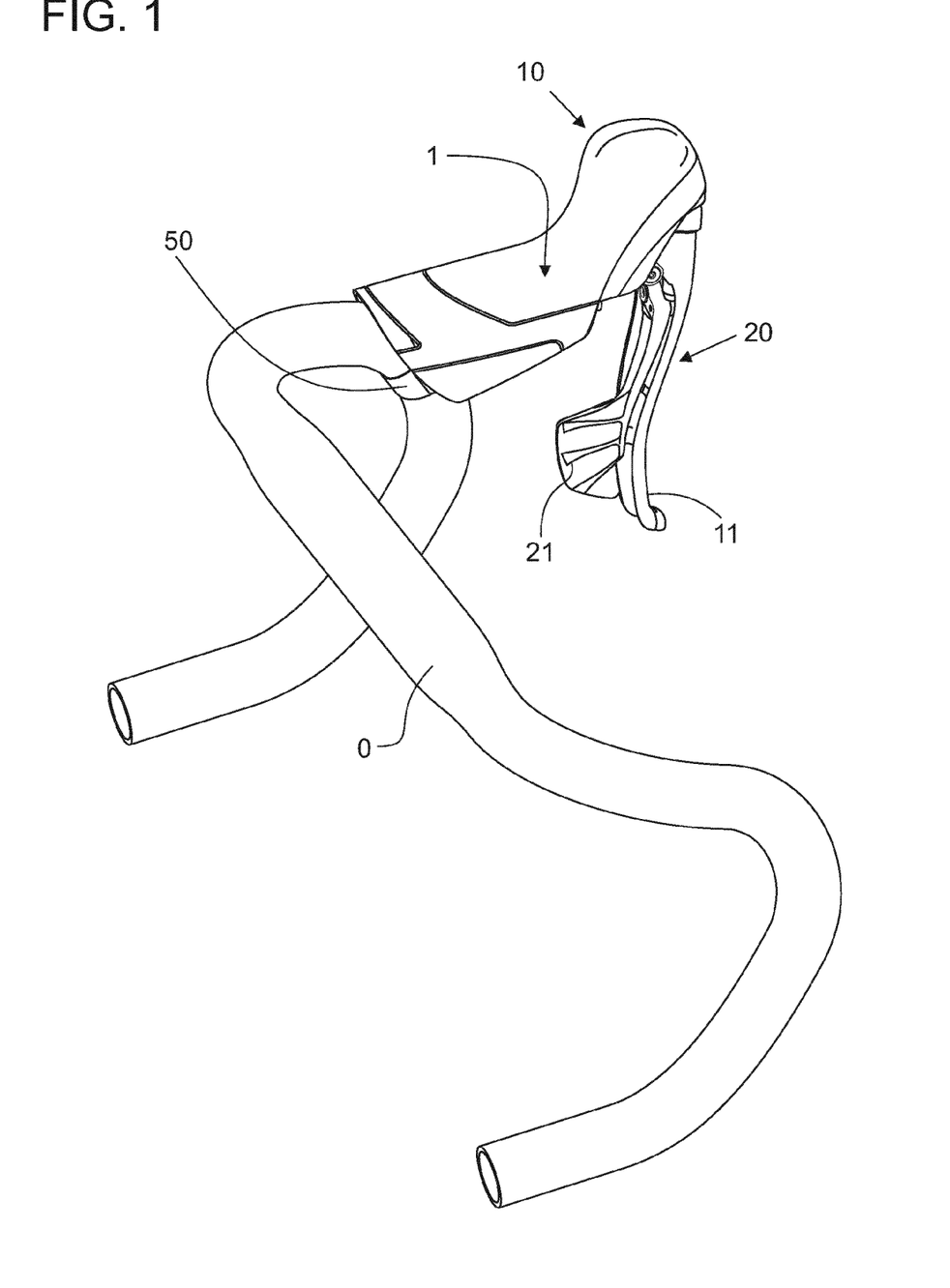
FIG. 1: Shows a bicycle dual control device (1) attached to a curved handlebar (0) of a road bicycle, and its two corresponding levers: the first acting element (11) for braking and the second acting element (21) for shifting.
Figure 2:
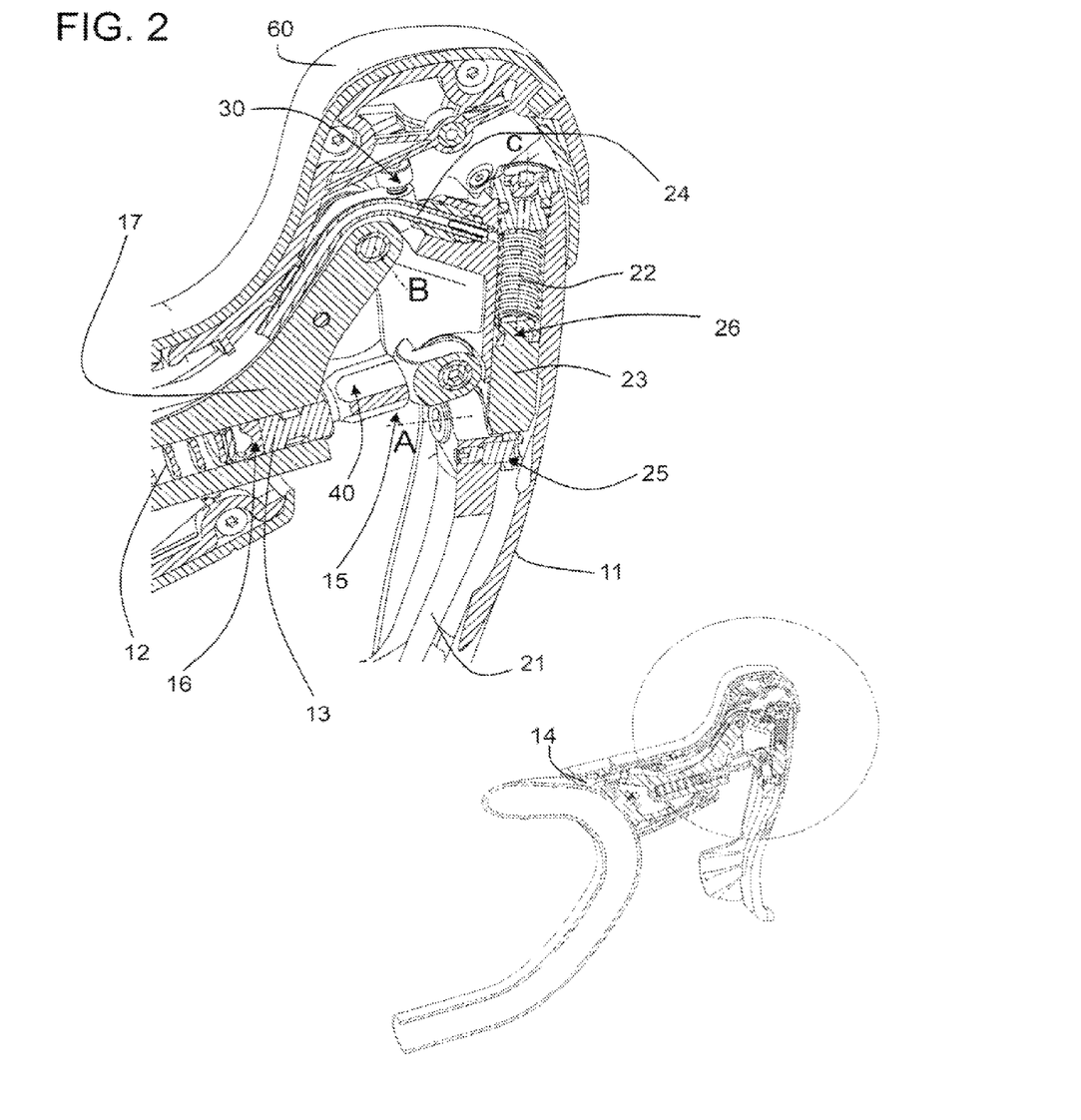
FIG. 2: Shows a detail section of said dual control device (1) with a housing cover (60), where the second operating member (26) is arranged in the same element with the first acting member (11) and it comprises its second master cylinder and piston (22 and 23) corresponding to the gear shift; there is also the first operating member (16) comprising its first master cylinder and piston (12 and 13) corresponding to the brake. It is also shown the corresponding hydraulic circuit (24) of the gear shift, the first supporting member (17) and the coupling assembly (15 and 25) of each control units. In addition it shows the rest adjustment assembly (40) and the reach adjustment assembly (30).

In a first case of this embodiment, shown in FIGS. 4 and 5, corresponding to the pivot axis B1 located at the top of the first supporting member (17), the first control circuit (14) works in hydraulic closed circuit (in the same way of functioning as in embodiment of FIG. 2), suitable for use for example, with rim brake which require a fixed volume of fluid in the braking system.

Figures 6, 6A, 6B, 6C:
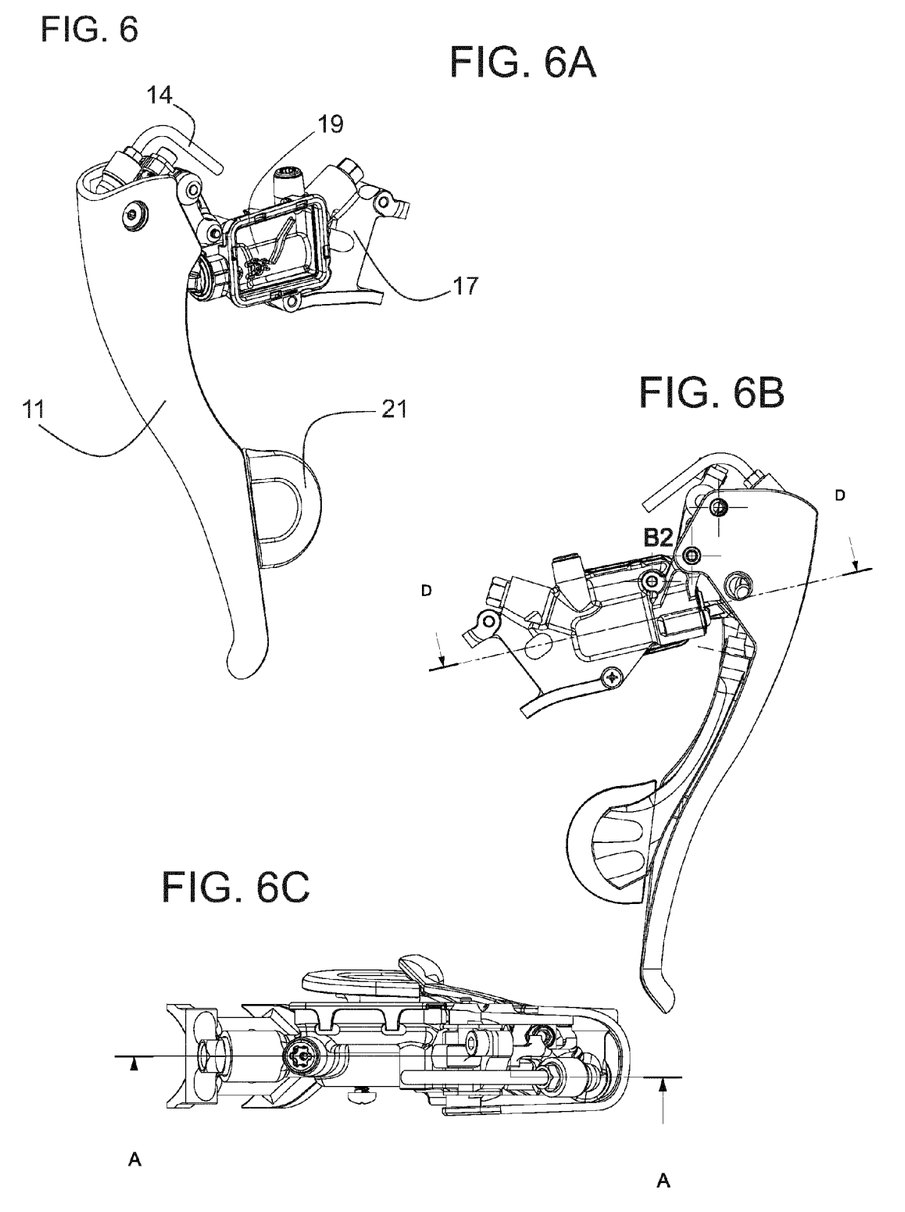
Figures 7, 7A:
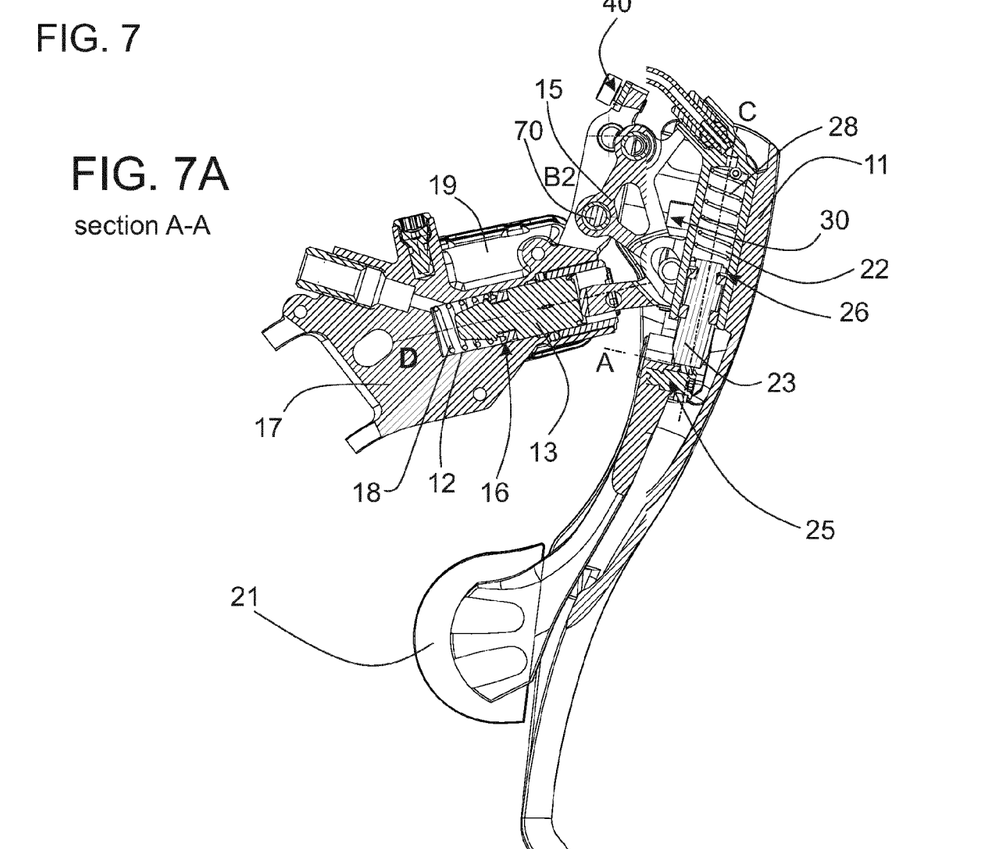
Figure 7B:
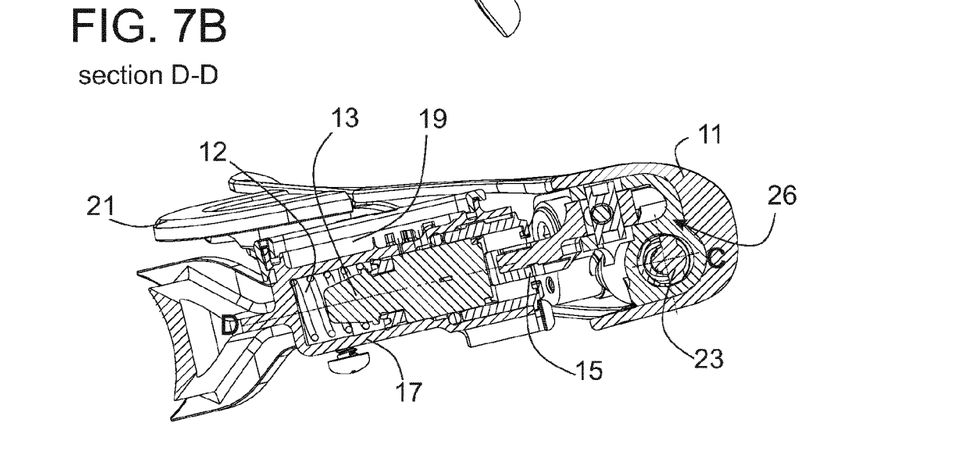
Figures 8, 8A:
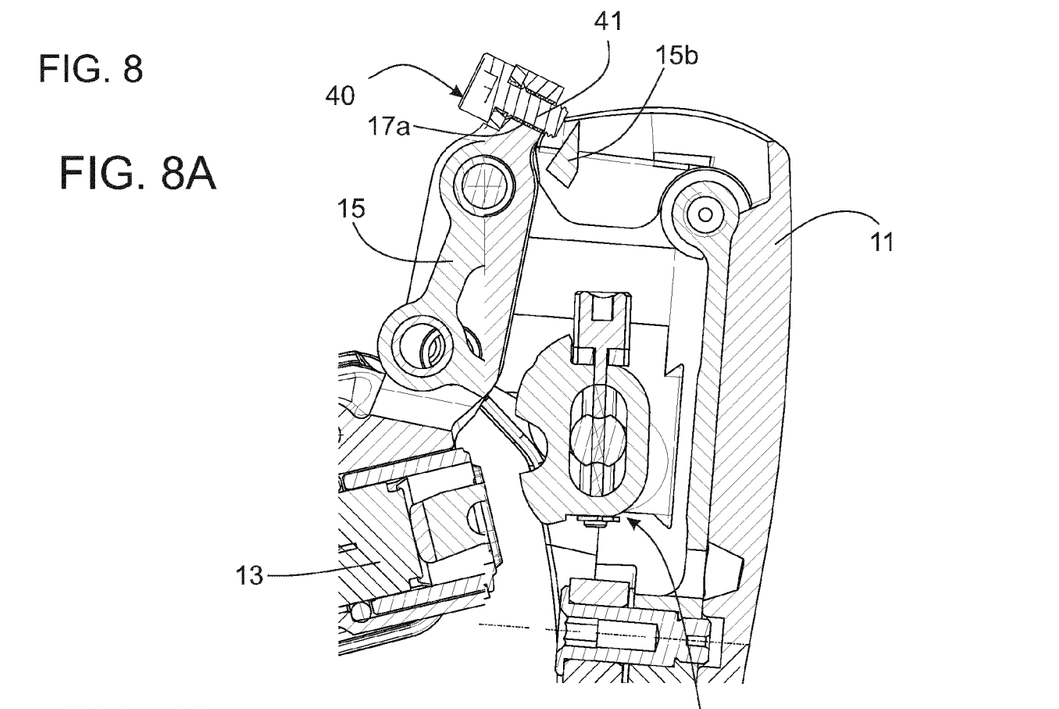
Figure 8B:
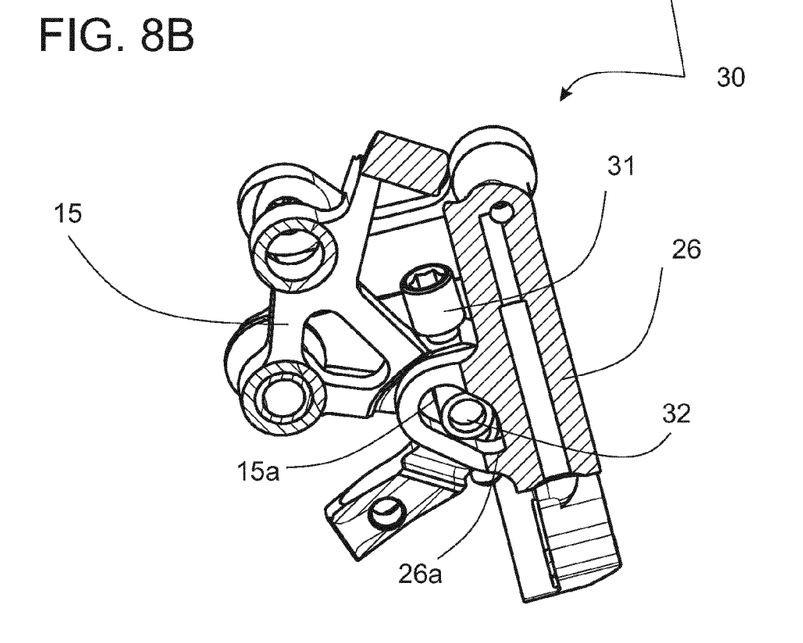
FIG. 8: Shows a detail of a preferred embodiment of the rest adjustment assembly (40) in FIG. 8A and of the reach adjustment assembly (30) in FIG. 8A. Said rest adjustment assembly (40) comprises a threaded screw (41) in a receiving opening (17a) in the upper part of the first supporting member (17), and a stop abutment (15b) arranged in the first coupling member (15). And said reach adjustment assembly (30) comprises: a slotted opening (26a) arranged in the second operating element (26); a receiving housing (15a) arranged in the first coupling assembly (15); an intermediate member (32) and a reach bolt (31).

In a second case of this embodiment, shown in FIGS. 6 and 7, corresponding to the pivot axis B2 located below the pivot axis B1 in the first supporting member (17), the first control circuit (14) works in hydraulic open circuit via the first fluid reservoir (19), suitable for use with disc brake which require a variable volume of fluid in the braking system.

In said alternative embodiment with two selectable first pivot axes for the first acting element (11), a further object of the present invention is a first unidirectional control unit (20), with different adjustment mechanisms:

The reach adjustment assembly (30) comprises: a slotted opening (26a) arranged in the second operating element (26); a receiving housing (15a) arranged in the first coupling assembly (15); an intermediate member (32) arranged as a pin with a cross threaded hole, housed in the slotted opening (26a); and a reach bolt (31) axially fixed in the receiving housing (15a), having an intermediate portion screwed into said intermediate member (32), so rotating said reach bolt (31), it changes the intermediate member (32) position within the slotted opening (26a) thus changing the relative position of the second operating element (26) in relation to the first coupling assembly (15).

The rest adjustment assembly (40) comprises a threaded screw (41) in a receiving opening (17a) in the upper part of the first supporting member (17), and a stop abutment (15b) arranged in the first coupling member (15), so that by threading the screw (41) more or less in its receiving opening (17a), it changes the first coupling assembly (15) angular position.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. In addition, the first and second control units and its corresponding driven mechanisms may correspond with any of the conventional ones used in bicycles, that is to say a shifting system, a suspension adjusting system, a braking system and so force.

The invention claimed is:

1. A bicycle dual control device (1) comprising:
 a housing cover (60), a first supporting member (17) attached to a bicycle handlebar (0) with a mounting member (50);
 a first unidirectional control unit (FCU) (10), configured to operate a first control mechanism through a first control circuit (14), comprising a first operating member (16) linked to the first control circuit (14) and operated by a first acting element (11) to be operated with the hand or fingers of a cyclist, and a first coupling assembly (15) which links said first operating member (16) with said first acting element (11), therefore the first acting element (11) pivots around a first pivot axis (B) of said first supporting member (17) orthogonal to a riding plane of the bicycle;

and a second unidirectional control unit (SCU) (20), configured to operate a second control mechanism through a second control circuit (24), comprising a second operating member (26) linked to the second control circuit (24) and operated by a second acting element (21) to be operated with the hand or fingers of the cyclist, and a second coupling assembly (25) which links said second operating member (26) with said second acting element (21);

characterized in that:

the second unidirectional control unit (20) is hydraulic and it is integrated inside the first acting element (11), and the second operating member (26) comprises a master cylinder of the second unidirectional control unit (22) mounted into the body of the first acting element itself (11) and a master piston of the second unidirectional control unit (23) reciprocating within said master cylinder of the second unidirectional control unit (22) and biased by means of a return spring of the second unidirectional control unit (28), being the second acting element (21) coupled to the master piston of the second unidirectional control unit (23) through the second coupling assembly (25) that pushes said master piston of the second unidirectional control unit (23) inside said master cylinder of the second unidirectional control unit (22).

2. The bicycle dual control device (1) according to claim 1, further comprising a fluid reservoir of the second unidirectional control unit (29) to store hydraulic fluid for generating hydraulic pressure in the second control circuit (24).

3. The bicycle dual control device (1) according to claim 1, characterized in that the second acting element (21) pivots around a second pivot axis (A) fixed into the first acting element (11), being the displacement of said second acting element (21) orthogonal to the displacement of said first acting element (11), thus said second acting element (21) moves jointly with the first acting element (11), and also has an additional rotating movement related to the first acting element (11) around said second pivot axis (A) therefore the rotating working movement of the second acting element (21) causes a displacement of the second coupling assembly and consequently a linear movement of the master piston of the second unidirectional control unit (23) within the master cylinder of the second unidirectional control unit (22), which increases the fluid pressure in the second control circuit (24).

4. The bicycle dual control device (1) according to claim 3, wherein the second pivot axis (A) of the second acting element (21) is orthogonal to a plane that contains a longitudinal axis (C) of the master cylinder of the second unidirectional control unit (22) and is parallel to the first pivot axis (B) of the second acting element (21).

5. The bicycle dual control device according to claim 1, characterized by further comprising a user adjustable reach adjustment assembly (30) to settle an angular resting position of the first acting element (11) in relation to the first supporting member (17).

6. The bicycle dual control device (1) according to claim 5, characterized in that the reach adjustment assembly (30) comprises a threaded receiving hole (17*a*) in the first supporting member (17), a stopper bolt (31) screwed into said receiving hole (17*a*) and a stop abutment (11*a*) arranged in the first acting member (11), so that by screwing in or out the stopper bolt (31), the stopper bolt (31) changes the angular resting position of said first acting member (11).

7. The bicycle dual control device (1) according to claim 5, characterized in that the reach adjustment assembly (30) comprises: a slotted opening (26*a*) arranged in the second operating element (26); a receiving housing (15*a*) arranged in the first coupling assembly (15); an intermediate member (32) arranged as a pin with a cross threaded hole, housed in the slotted opening (26*a*); and a reach bolt (31) axially fixed in the receiving housing (15*a*), having an intermediate portion screwed into said intermediate member (32), so rotating said reach bolt (31), the reach bolt changes the intermediate member (32) position within the slotted opening (26*a*) thus changing a relative position of the second operating element (26) in relation to the first coupling assembly (15).

8. The bicycle dual control device (1) according to claim 1, characterized in that the first control circuit (14) is cable driven, and the first operating member (16) is a pull-release cable type comprising a pulling element to pull the cable driven first control circuit (14), so that the movement of the first acting element (11) moves said pulling element in a pulling direction of a cable.

9. The bicycle dual control device (1) according to claim 1 wherein the first control unit (10) drives a bicycle braking mechanism.

10. The bicycle dual control device (1) according to claim 1, characterized in that the second control unit (20) drives a bicycle gear shifting mechanism for a corresponding derailleur, whose indexing mechanism is not an integrated part of said dual control device (1).

11. The bicycle dual control device (1) according to claim 1, characterized in that the first operating member (16) is hydraulic and comprises a master cylinder of the first unidirectional control unit (12), a master piston of the first unidirectional control unit (13) reciprocating within said master cylinder of the first unidirectional control unit (12) and biased by means of a first return spring (18), and a first coupling assembly (15) which links the master piston of the first unidirectional control unit (13) with the first acting element (11).

12. The bicycle dual control device (1) according to claim 11, characterized in that said first pivot axis (B) of said first supporting member (17) may be chosen by the cyclist between two different positions (B1, B2), by screwing a double function pivot pin (70) in the two different positions (B1, B2) arranged in the first acting member (11), thus allowing to have two different working positions for the first acting element (11) with two corresponding different strokes of the master piston of the first unidirectional control unit (13), and consequently two different working pressures in the first control circuit (14).

13. The bicycle dual control device (1) according to claim 11, characterized by further comprising a first fluid reservoir (19) to store hydraulic fluid for generating hydraulic pressure in the first control circuit (14).

14. The bicycle dual control device (1) according to claim 13, characterized in that the first fluid reservoir (19) is provided in the first supporting member (17), and the first fluid reservoir is in communication with the master cylinder of the first unidirectional control unit (12) via opening holes arranged in the master cylinder of the first unidirectional control unit (12), in such a manner, that the first control circuit (14) is able to work in an open circuit or in a closed one, depending on a resting position of the master piston of the first unidirectional control unit (13) within the master cylinder of the first unidirectional control unit (12) that defines a different relative position between the master piston of the first unidirectional control unit (13), and said opening holes arranged in the master cylinder of the first unidirectional control unit (12).

15. The bicycle dual control device (1) according to claim 11, characterized in that the first coupling assembly (15) comprises a pivoting link that transforms an angular displacement of the first acting element (11) towards the handlebar (0), in a linear movement of the master piston of the first unidirectional control unit (13) inside the master cylinder of the first unidirectional control unit (12) and then pushing hydraulic fluid in the first control circuit (14).

16. The bicycle dual control device (1) according to claim 11, characterized by further comprising a cyclist adjustable rest adjustment assembly (40) to adjust an initial resting position of the master piston of the first unidirectional control unit (13) within the FCU master cylinder (12).

17. The bicycle dual control device (1) according to claim 16, characterized in that the rest adjustment assembly (40) is arranged as a threaded connecting rod on the first coupling assembly (15) configured to push an amount of said master piston of the first unidirectional control unit (13) inwards towards the master cylinder of the first unidirectional control unit (12) by screwing in or out, thus changing the initial resting position of the master piston of the first unidirectional control unit (13).

18. The bicycle dual control device (1) according to claim 16, characterized in that the rest adjustment assembly (40) comprises a threaded screw (41) in a receiving opening (17a) in an upper part of the first supporting member (17), and a stop abutment (15b) arranged in the first coupling member (15), so that by threading the screw (41) more or less in the receiving opening (17a), the screw changes an angular position of the first coupling assesmbly (15).

* * * * *